H. B. MARSHAL.
Brake for Vehicles.
No. 74,559.
Patented Feb. 18, 1868.
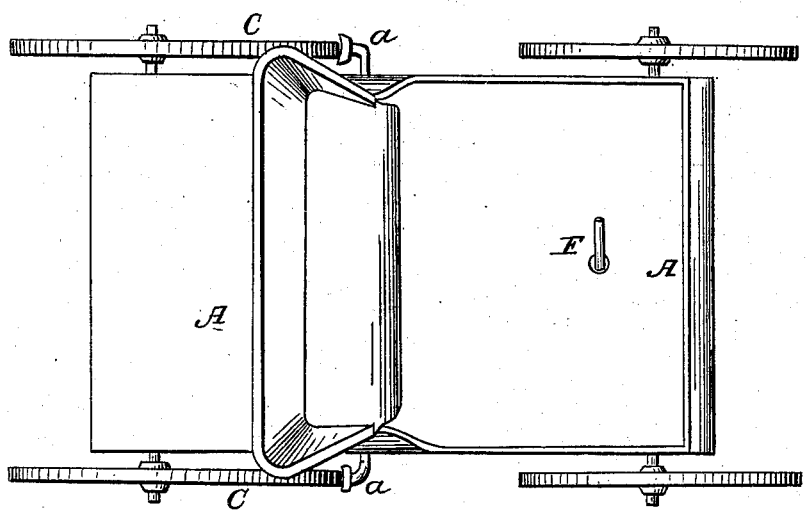
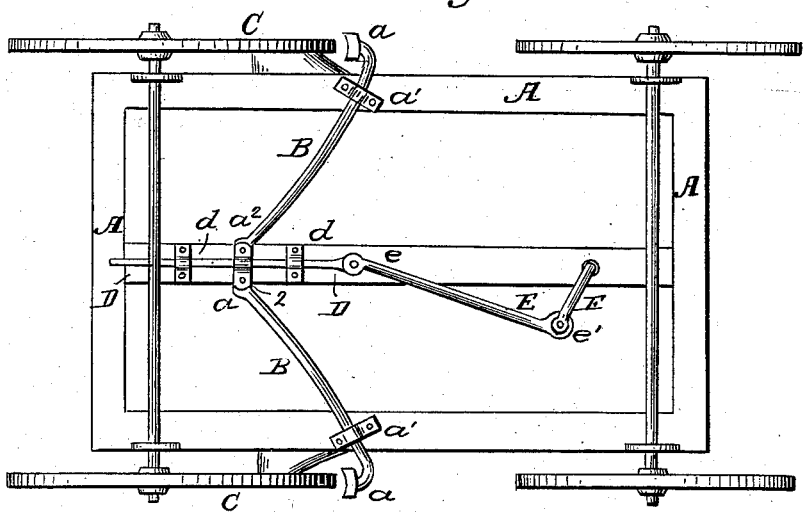
Witnesses:
Inventor:
H. B. Marshall
per Munn & Co
Attorneys

United States Patent Office.

HORACE B. MARSHALL, OF WALDOBORO, MAINE, ASSIGNOR TO HIMSELF AND SAMUEL R. BRIDGHAM, OF HEBRON, MAINE.

Letters Patent No. 74,559, dated February 18, 1868.

IMPROVEMENT IN BRAKE FOR VEHICLES.

The Schedule referred to in these Letters Patent and making part of the same.

TO ALL WHOM IT MAY CONCERN:

Be it known that I, HORACE B. MARSHALL, of Waldoboro, in the county of Lincoln, and State of Maine, have invented a new and improved Brake-Attachment for Wheel-Vehicles; and I do hereby declare that the following is a full, clear, and exact description thereof, which will enable others skilled in the art to make and use the same, reference being had to the accompanying drawings, forming part of this specification.

This invention relates to a new and improved method of constructing and attaching brakes to wheel-vehicles, whereby the same are more simple and effectual in their operation. It consists of a brake-block, attached to the ends of levers on each side of the carriage or vehicle, connected by pivots to a reciprocating main shaft, operated by a crank or lever, connected thereto with a connecting-rod, in such a manner as that said brake may be operated by the foot of a rider acting upon said crank. In the accompanying plate of drawings—

Figure 1 is a plan view of a wagon with my invention, showing the brake-blocks, and the crank or lever by means of which the same are operated.

Figure 2 is a plan view of my invention in position on the bottom of a wagon.

Similar letters of reference indicate corresponding parts.

A is the wagon; B B are the brake-levers; C are the hind wheels; D is the main shaft; $d$ are plates, securing the shaft D to the wagon A; $a$ are the brake-blocks; $a^1$ are plates, securing the brake-levers B to the wagon A; $a^2$ are pivots, by means of which the levers B are pivoted to the main shaft D; $e$ is a pivot, connecting the connecting-rod E to the main shaft D; $e'$ is a pivot, connecting the connecting-rod E to the crank F. Upon the under side of any straight-bodied wagon or other four-wheel vehicle, A, and near the back end of the same, and secured thereto by the plates or clamps $d$, as shown, and so as to permit the same to slide backwards and forwards in said plates, is a main shaft, D. Said shaft D is so placed upon the wagon A as to be in a longitudinal line with the body of the wagon A, and is made of iron or other suitable material, of sufficient size to give the necessary strength for operating the brakes $a$, and may be of any convenient length. To each side of the main shaft D, and pivoted in suitable ears attached to the same, and so as to be, when the pressure is taken from the brakes, a little back of the fore side of the hind wheel, one upon each side of said shaft D, are the brake-levers B, as shown in the drawing, fig. 2. Said brake-levers B are made of iron or other suitable material, of about the strength of the shaft D, and extend across the wagon A, and a little forwards and beyond the sides of the wagon A, when the same are bent so as to receive the brake-blocks $a$, as shown in the drawing, said levers B being held upon the sides of the wagon by the plates or clamps $a^1$, which said clamps $a^1$ also serve for the fulcra of the levers B. The brake-blocks $a$ are made of wood or other suitable material, and are of the form, and are secured to the end of the levers B in the same manner, as the brake-blocks now commonly in use. To the front end of shaft D, and pivoted thereto in the ordinary way, by a pivot, $e$, as shown, is a metallic connecting-rod, E, said connecting-rod E being pivoted to the other end of the same; also, in the usual way, to the crank or lever F, as shown. The crank or lever F is a bent metallic rod, bent so as to form a lever, the fulcrum of the same being a part thereof, which passes through the body of the wagon. The lever or crank F is so bent as that the longer arm of the same is upon the bottom of the wagon, in a horizontal line, and at all times within reach of the foot of the rider, and is pivoted by the shorter arm thereof, under the wagon A, to the connecting-rod E, by the pivot $e'$.

The operation is such, that by the rider pushing upon the longer arm of the lever F, the main shaft D will be drawn forward, and the brake-blocks $a$ upon the levers B, attached to said main shaft, will be forced upon or against the tire of the wheel C. The longer arms of the levers B and F are to the shorter arms of the same, in respect to length, in the proportion to the increased power required to be applied to the brakes $a^1$.

Constructed as above shown and described, it constitutes a cheap and reliable brake-attachment to four-wheeled vehicles, the advantages of which are, that the brake-blocks $a$ serve also as a step to assist the rider in mounting the carriage, and that the same are more conveniently operated by the foot, and the same are more powerful, and produce greater friction with the same power applied to the lever F upon the wheels C, and are therefore more safe, and the same are less likely to get out of repair.

I claim as new, and desire to secure by Letters Patent—

1. A brake-attachment for four-wheeled vehicles, composed of the shaft D, levers B, brakes $a$, and connecting-rod E, and lever F, substantially as shown and described, and for the purposes set forth.

2. The sliding main shaft D, in combination with the bent levers B, and brake-blocks $a$, and connecting-rod E, and lever or crank F, or its equivalent, substantially as shown and described, and for the purposes set forth.

HORACE B. MARSHALL.

Witnesses:
    S. W. JACKSON,
    R. BROWN.